United States Patent
Lindroos et al.

(10) Patent No.: US 8,160,421 B2
(45) Date of Patent: Apr. 17, 2012

(54) AUDIO ROUTING FOR AUDIO-VIDEO RECORDING

(75) Inventors: Sanna Lindroos, Tampere (FI); Sanna M. Koskinen, Tampere (FI); Heli Jarventie, Tampere (FI); Vesa Huotari, Tamper (FI); Paivi Heikkila, Tampere (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 1200 days.

(21) Appl. No.: 11/612,057

(22) Filed: Dec. 18, 2006

(65) Prior Publication Data
US 2008/0145032 A1 Jun. 19, 2008

(51) Int. Cl.
*H04N 9/80* (2006.01)
*H04N 5/78* (2006.01)
(52) U.S. Cl. ......................... 386/241; 386/323
(58) Field of Classification Search .................. 386/323, 386/362, 241, 242, 210, 224
See application file for complete search history.

(56) References Cited

U.S. PATENT DOCUMENTS

| 6,072,933 | A * | 6/2000 | Green | 386/278 |
| 7,738,997 | B2 * | 6/2010 | Lin | 700/245 |
| 2005/0175315 | A1 * | 8/2005 | Ewing | 386/46 |
| 2006/0229114 | A2 * | 10/2006 | Kim | 455/575.1 |
| 2007/0079383 | A1 * | 4/2007 | Gopalakrishnan | 726/26 |

OTHER PUBLICATIONS

Website article, "Videoguys Azden Wireless & Shotgun Microphone Pages", printed from <http://www.videoguys/com/azden.htm> on Dec. 18, 2006; date of publication not known but prior to Applicants' filing date, 8 pages.
Website article, "Audio Play and Record OCX download from Programming category", printed from <http://www.sofotex.com/Audio-Play-And-Record-OCX-download_L8571.html> on Dec. 18, 2006; date of publication not known but prior to Applicants' filing date, 2 pages.

* cited by examiner

*Primary Examiner* — Robert Chevalier
(74) *Attorney, Agent, or Firm* — AlbertDhand LLP (57) ABSTRACT

Systems and methods for routing audio for audio-video recordings allow a user to record desired audio with captured video at the time the video is being captured. Audio from one or more sources may be routed to the video capture application and recorded with the video. In one or more examples, audio may be routed from another application, e.g., an audio playback application, running on the same device as the video capture application. In another example, audio may be received from a remote device through a wireless connection. Multiple streams of audio content may be mixed together prior to storing with video. The audio, upon reception, may then be routed to the video capture application for recordation. An audio progression bar may also be provided to indicate duration and elapsed time information associated with the audio being recorded.

21 Claims, 7 Drawing Sheets

AUDIO ROUTING FOR AUDIO-VIDEO RECORDING

FIELD OF ART

The invention relates generally to a method and system for routing audio for recordation with video.

BACKGROUND

For many movies and video clips, audio is often added after the video has already been captured and recorded. Videos are typically edited using software that allows a user to incorporate various types of audio content (e.g., music, sound effects, narration) into the video. For example, a filmmaker may record video for a movie and only later add-in the sound effects and soundtrack music. This post-recordation editing process may be time consuming and laborious as the video and audio may require further editing and/or formatting prior to combining the two. Further, editing software is often needed in addition to the video/audio capture applications. As such, not only might video and audio editing be time consuming, but it may also increase costs associated with producing a movie or video clip. Additionally, it is often difficult for a user capturing video to gauge how much audio content is left. Without being able to determine an amount of audio content remaining, a user may be unable to appropriately time the ending of a video.

SUMMARY

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Audio routing provides recordation of desired audio content in conjunction with the capture of video. Users may initiate capturing of video and route audio from other sources into the video recording. For example, a user may begin recording video using a video capture application. The application may then determine whether audio is available from one or more sources including other devices and other applications. Devices may transfer audio content to other devices using wireless and wired transmission methods. The application may then prompt the user to decide whether the user wants to route audio content from the one or more sources into the video. If so, the audio content may be recorded while the video is being captured. If, however, the user does not want to record the audio content with the video, a default video capture mode may be used. Audio may be routed from other applications running on the same video capture device or on a different device. For example, audio may be transmitted from a first terminal to a second terminal for recording with video captured by the second terminal. In another example, an audio playback application running on a terminal may be used to provide audio to a video capture application capturing video on the same terminal.

Audio content from multiple sources may further be mixed prior to being recorded with captured video. For example, if audio content is available from both a remote terminal and an input device of a video capturing terminal, the audio content streams from both sources may be combined using various mixing methods to produce a composite audio signal. The audio signal may then be encoded, synchronized with and/or recorded with the video being captured by the capturing terminal. Alternatively or additionally, a user may select one or more streams of audio content from multiple available streams to mix and record with captured video. Further, users may be provided mixing controls to adjust various attributes of the input streams and/or of the resultant signal. For example, a user may configure a recording such that background noise received from a microphone input device is recorded at a lower volume than sound effects received from another device. In another example, a user may modify the treble and bass levels of a resultant composite audio signal.

According to another aspect, an audio progress bar may be displayed on a user interface of a video capturing application. The audio progress bar may provide a variety of information including audio content duration, elapsed playback time, amount downloaded/received, audio content title and the like. The audio progress bar allows a user to gauge an amount of remaining audio. As such, a user who has thirty seconds of remaining audio may determine whether to speed up or slow down his or her video capturing.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1:
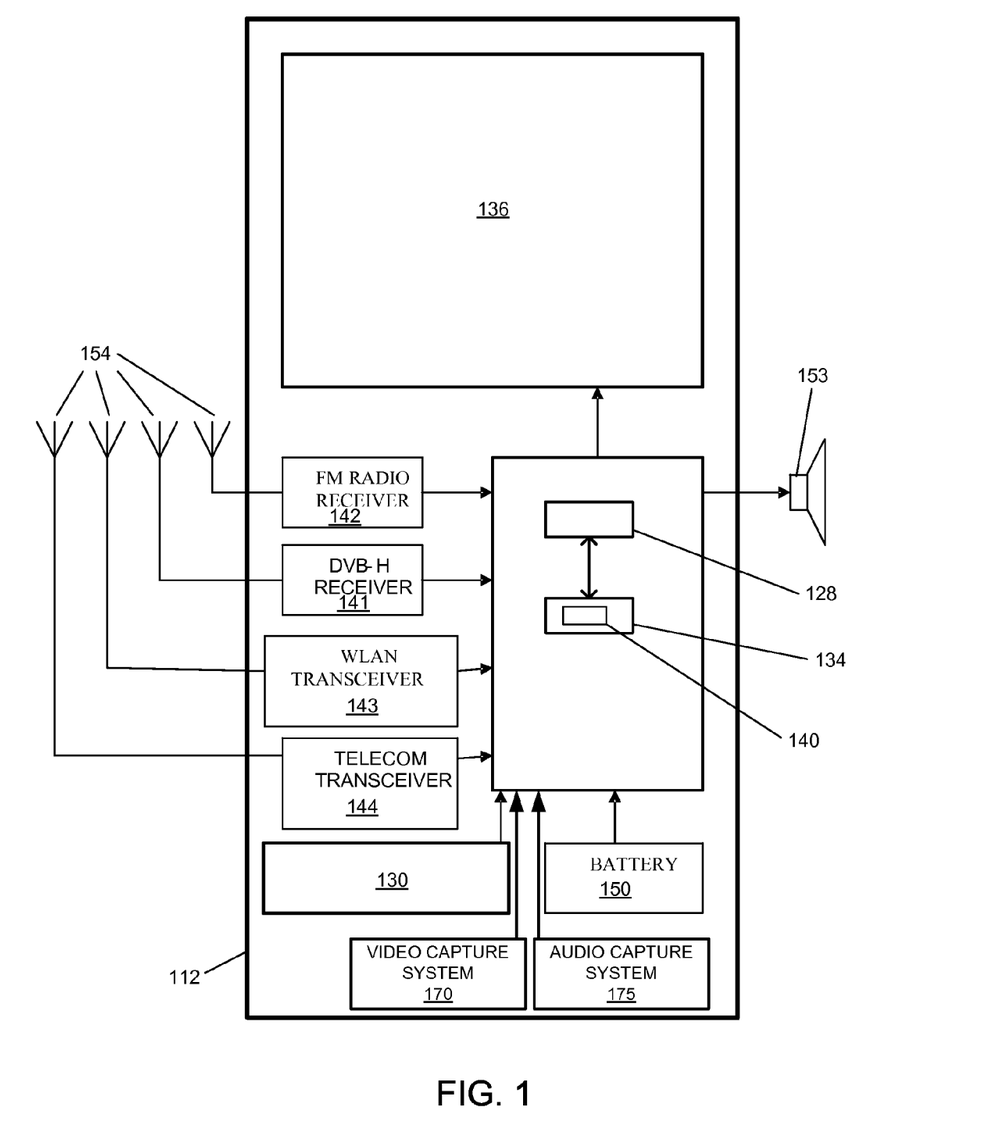
FIG. 1 illustrates a mobile terminal on which one or more aspects described herein may be implemented.

FIG. 1 illustrates a block diagram of a terminal including processor 128 connected to user interface 130, memory 134 and/or other storage, and display 136. Mobile terminal 112 may also include battery 150, speaker 153 and antennas 154. User interface 130 may further include a keypad, touch screen, voice interface, one or more arrow keys, joy-stick, data glove, mouse, roller ball, touch screen, or the like. Mobile terminal 112 may comprise a computer, personal data assistant (PDA), mobile telephone and the like.

Computer executable instructions and data used by processor 128 and other components within mobile terminal 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile terminal 112 to perform various functions. Alternatively, some or all of mobile device 112 computer executable instructions may be embodied in hardware or firmware (not shown).

Mobile terminal 112 may be configured to receive, decode and process digital broadband broadcast transmissions that are based, for example, on the DVB standard, through a specific DVB receiver 141. The mobile device may also be provided with other types of receivers for digital broadband broadcast transmissions. Additionally, mobile terminal 112 may also be configured to receive, decode and process transmissions through FM/AM Radio receiver 142, WLAN transceiver 143, and telecommunications transceiver 144. Transceivers 143 and 144 may, alternatively, be separated into individual transmitter and receiver components (not shown). In one aspect of the invention, mobile terminal 112 may receive Radio Data System (RDS) messages. Other transmission and reception systems may also be used including Bluetooth transceivers. In one or more instances, signals may be transmitted to and received from another mobile terminal (not shown). For example, audio, video and other signals may be transmitted between two terminals using various transmissions protocols (e.g., WLAN or Bluetooth).

Additionally, mobile terminal 112 may comprise various multimedia capture systems such as video/image capture system 170 and audio capture system 175. Video/image capture system 170 may comprise a video capture device capable of capturing still images and motion video (e.g., a video camera). For example, a cell phone may include a camcorder feature that allows a user to record live video. Audio capture system 175 may include devices such as a microphone, an electronic instrument, a playback device and the like. The video capture and audio capture devices may be external to mobile terminal 112 or built-in internal devices. For example, an electronic instrument may be a plug-in device connectable to terminal 112 through a jack or other connectors. Alternatively or additionally, a microphone may be built-in to terminal 112. In one or more configurations, systems 170 and 175 may further include adapters for processing the signals received from the capture devices. Each of video capture system 170 and audio capture system 175 may be connected to memory 140 and processor 128. Captured audio and video may be stored in memory 140 while processor 128 may execute instructions or applications used in audio and video capturing. For example, software 134 may include one or more applications that manages capture systems 170 and 175 and their captured content.

Figure 2:
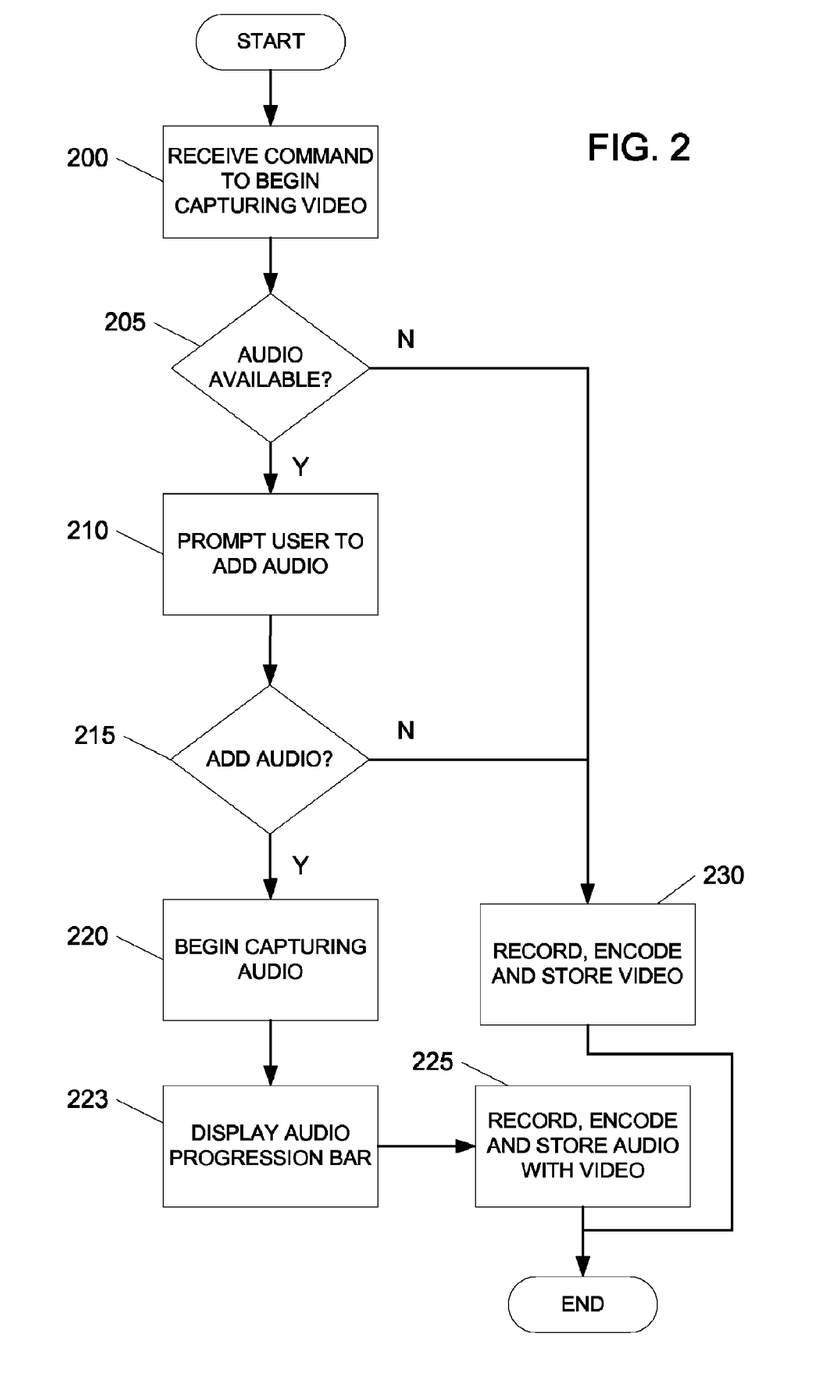
FIG. 2 is a flowchart illustrating a method for capturing video with a first application and recording the captured video along with audio received from a second application according to one or more aspects described herein.

FIG. 2 is a flowchart illustrating a method for receiving and recording audio in conjunction with captured video. In step 200, a video capture application running on a terminal (e.g., mobile terminal 112 of FIG. 1) may receive a command to begin capturing video (e.g., live video) using a video capture device. The video capture application may then determine whether audio is available in step 205. The determination may include the video capture application scanning each of the terminal's audio inputs and outputs to determine whether audio is being inputted into or outputted from the device. In one example, the video capture application may determine whether audio content is currently being played and outputted from the terminal and/or whether audio is being received from another terminal or device. In one or more configurations, a default music track may be played automatically upon initiating video capture.

In response to determining that audio is being inputted into or outputted from the terminal, the video capture application may ask the user whether he or she wants to add the corresponding audio into the video recording in step 210. If the application determines that the user would like to add the audio into the video recording in step 215, the application may begin capturing the audio in step 220. In step 223, the application may display an audio progression bar during the capturing of the audio and video. The progression bar may indicate a variety of audio information such as audio length, elapsed time and content size. The captured audio may then be encoded and stored along with the video recording in one or more multimedia formats in step 225. Multimedia formats may include Motion Picture Experts Group (MPEG) format, QuickTime formats and the like. If, however, in steps 210 and 215, it is determined that the user does not want to add the available audio or if audio is not available, only the video may be recorded and stored in step 230.

In one or more configurations, if audio is detected from multiple inputs and/or outputs, the capture application may ask a user whether he or she would like to mix or combine the audio from two or more of the various inputs and outputs. Alternatively or additionally, a user may be given a choice of audio content to record with the captured video. For example, a capture application may display the various audio content available (e.g., being inputted to or outputted from a terminal on which the application is running) and allow the user to individually select one or more of the audio content for mixing and recording.

Figure 3A:
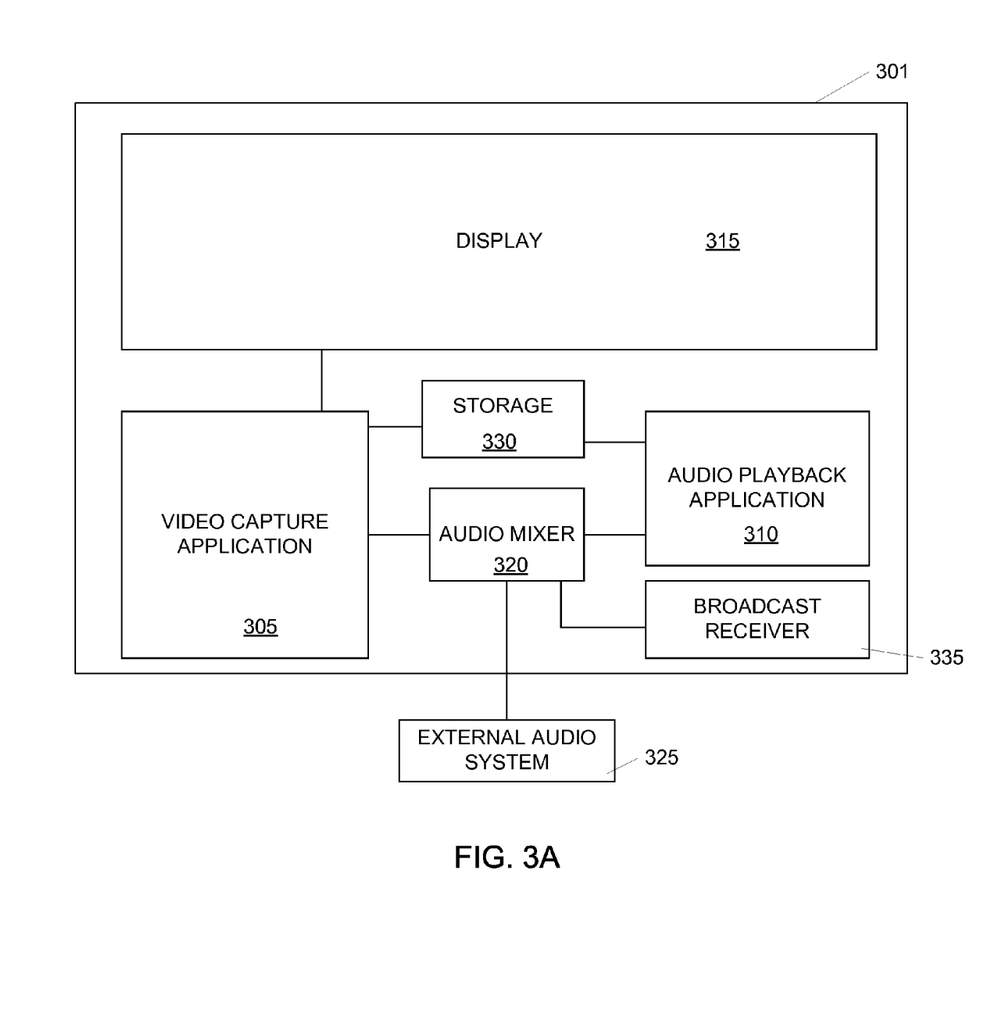
FIGS. 3A and 3B illustrate block diagrams corresponding to systems for capturing video with audio from one or more sources according to one or more aspects described herein.
Figure 3B:
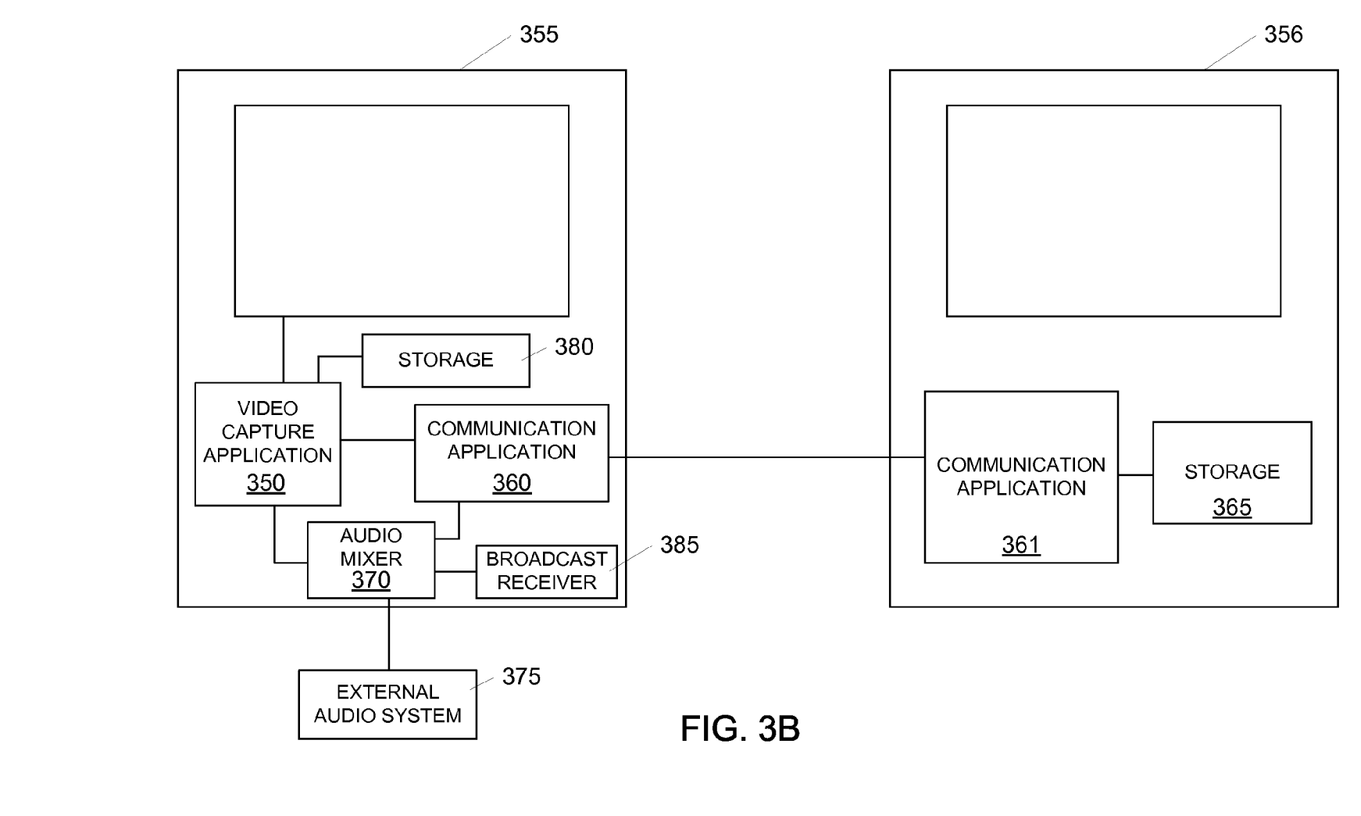

FIGS. 3A and 3B illustrate block diagrams of systems for capturing video along with audio from different sources. FIG. 3A illustrates a system for capturing video using first application 305 on terminal 301 and recording audio output from second application 310 along with the captured video. First application 305 may, for example, include an audio-video capture program configured to record motion video and audio. Second application 310, on the other hand, may include an audio playback application such as WINDOWS MEDIA PLAYER, REALPLAYER, WINAMP and the like. Such audio playback applications may output a variety of audio content including stored audio files (e.g., from storage 330), broadcast audio (e.g., radio) and the like. Audio output application 310 may be outputting audio in the background while capture application 305 is recording video and/or audio. As such, the system may allow a user to route the audio being outputted by application 310 to capture application 305 so that the outputted audio is incorporated into a captured audio-video file. In one or more configurations, the audio signals being outputted by application 310 may be duplicated and routed to application 305 as audio input. The routing may be performed by the audio output application, the video capture application or an intermediate application or component (not shown) of terminal 301. Application 305 may further combine multiple audio streams (e.g., from multiple sources) prior to recording and associating the plurality of audio with the captured video. Various methods for mixing audio input may be used to produce a composite audio signal for recording with captured video. Additionally, captured video may be displayed on display 315 while recording. Other information may also be displayed on display 315 including information relating to audio being recorded with the video. The recorded audio and video may be stored in storage 330.

According to one or more aspects, terminal 301 may further include audio mixer 320 that allows multiple streams of audio to be mixed or combined. Thus, in one example, background music received from audio playback application 310 may be mixed with narration received from external audio system 325 (e.g., a microphone) connected to terminal 301. Particularly, the two streams of audio content may be mixed to form a single audio signal for recording with the video. Alternatively or additionally, terminal 301 may receive radio and other audio broadcasts through broadcast receiver 335. The audio content received through receiver 335 may similarly be mixed into a composite audio signal to be recorded with the captured video. In one or more configurations, audio mixer 320 may allow a user to control the volume and/or other attributes of each audio stream. As such, background music may be recorded at a lower volume than narration received through external audio system 325.

FIG. 3B illustrates a system for capturing video using capture application 350 on terminal 355 in conjunction with audio transmitted to terminal 355 from terminal 356. Audio may be transferred from terminal 356 to terminal 355 using a variety of content transfer applications, such as applications 360 and 361. As such, before or after application 350 begins capturing video, terminal 356 may request and initiate a transfer of audio content to terminal 355 using communication application 361. Communication applications 360 and 361 may include Bluetooth and/or WLAN communication protocols and/or software for controlling the receivers, transmitters and/or transceivers of terminals 355 and 356, respectively. The audio content to be transferred may be extracted from storage 365 in terminal 356 and subsequently transmitted by application 361. If the transfer is accepted by terminal 355, the audio content may be downloaded into storage medium 380 of terminal 355. In one or more configurations, the transfer of audio content comprises a streaming transfer. The transmitted audio content may further be routed from communication application 360 to video capture application 350 such that the received audio is recorded along with the captured video. The audio-video recording may be stored in storage medium 380.

As discussed, if different and additional audio content is available from another source, the additional audio content may be mixed together to form a single audio signal for recording and synchronization with the video. For example, audio content may be received from each of device 356, external audio system 375 and broadcast receiver 385. Each stream of audio may be fed into audio mixer 370 that combines the audio signals into a single composite signal for recordation with video captured by application 350. Mixer 370 may provider controls for a user to adjust various audio characteristics of each audio content stream for mixing.

Figure 4:
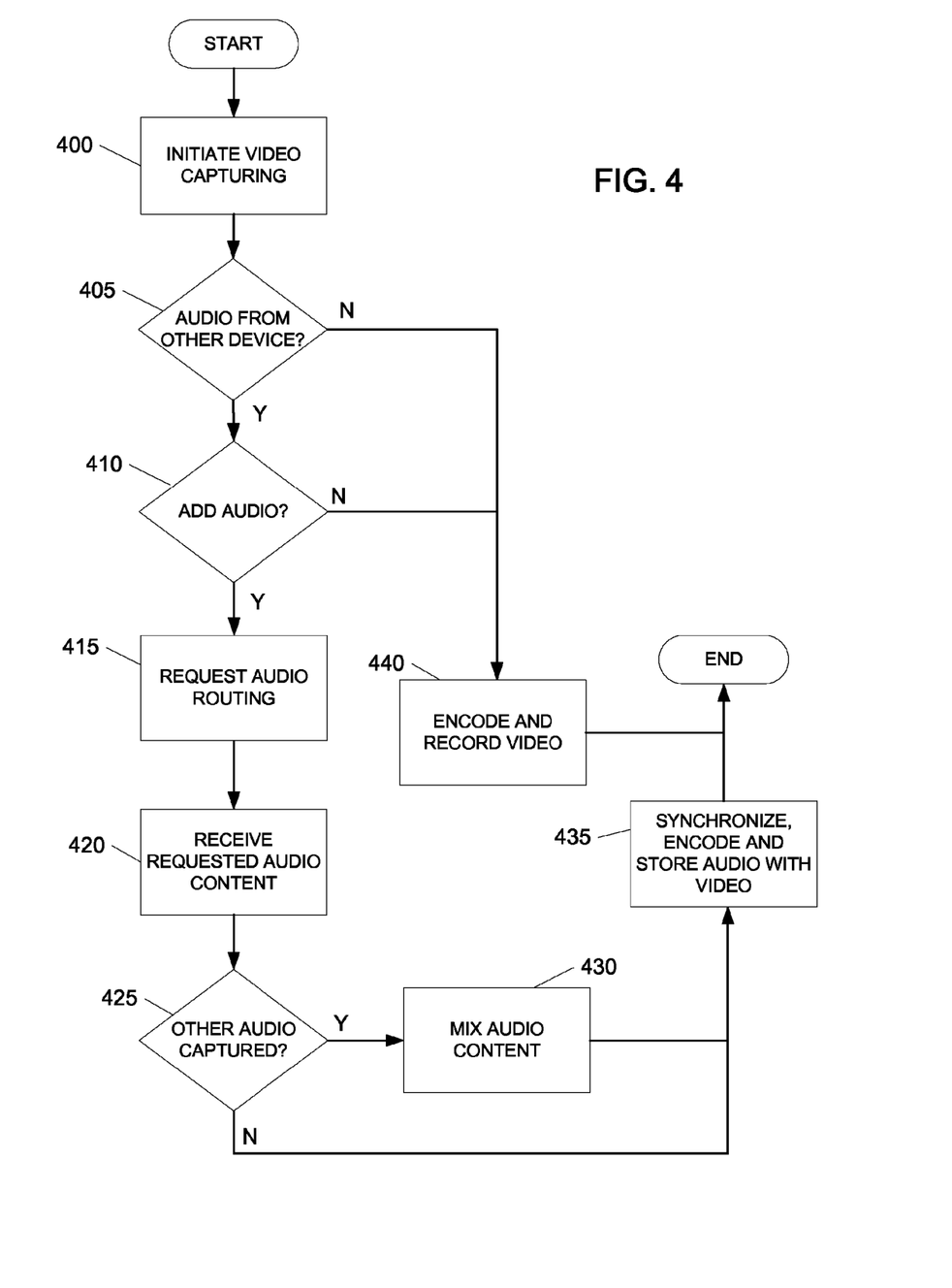
FIG. 4 is a flowchart illustrating a method for capturing video using a first device and recording the video with audio from a second device according to one or more aspects described herein.

FIG. 4 is a flowchart illustrating a method for recording, at a first device, audio received from another device along with captured video. In step 400, a video capture application of a first device may initiate video capturing in response to user input. For example, a user may select a record option that activates video capturing. In step 405, the video capture application may determine whether audio is being transmitted from a second device. For example, a user may be downloading or otherwise receiving a music file from a friend's mobile terminal. In response to determining that audio is being transmitted from a second device, the video capture application may determine whether the user would like the audio being transmitted to be recorded as part of the video in step 410. If the application determines that the user wants the audio to be recorded, the application may request that the audio be routed to the application in step 415. For example, the application may send a request to the operating system for the audio content. In response to the request, the application may begin receiving the audio content in step 420.

In step 425, the application may further determine whether other audio content is being captured or otherwise available. If other audio is available and/or being captured, the audio content transmitted from the second device may be mixed with the other audio content in step 430. In one or more configurations, a user may be asked whether the audio content should be mixed. If the user does not want the audio content mixed, he or she may be asked to select the audio content to be recorded. In addition, a user may be provided controls for configuring the output levels of the various audio content streams to the audio-video recording. The controls may also allow a user to adjust various audio attributes such as treble and bass. In step 435, the audio content (if no other audio content is being captured) or mixed audio content may then be synchronized and recorded with the captured video. If, on the other hand, audio is not being received from another device, the captured video may be encoded and stored alone or with audio content from one or more other sources in step 440.

Figure 5A:
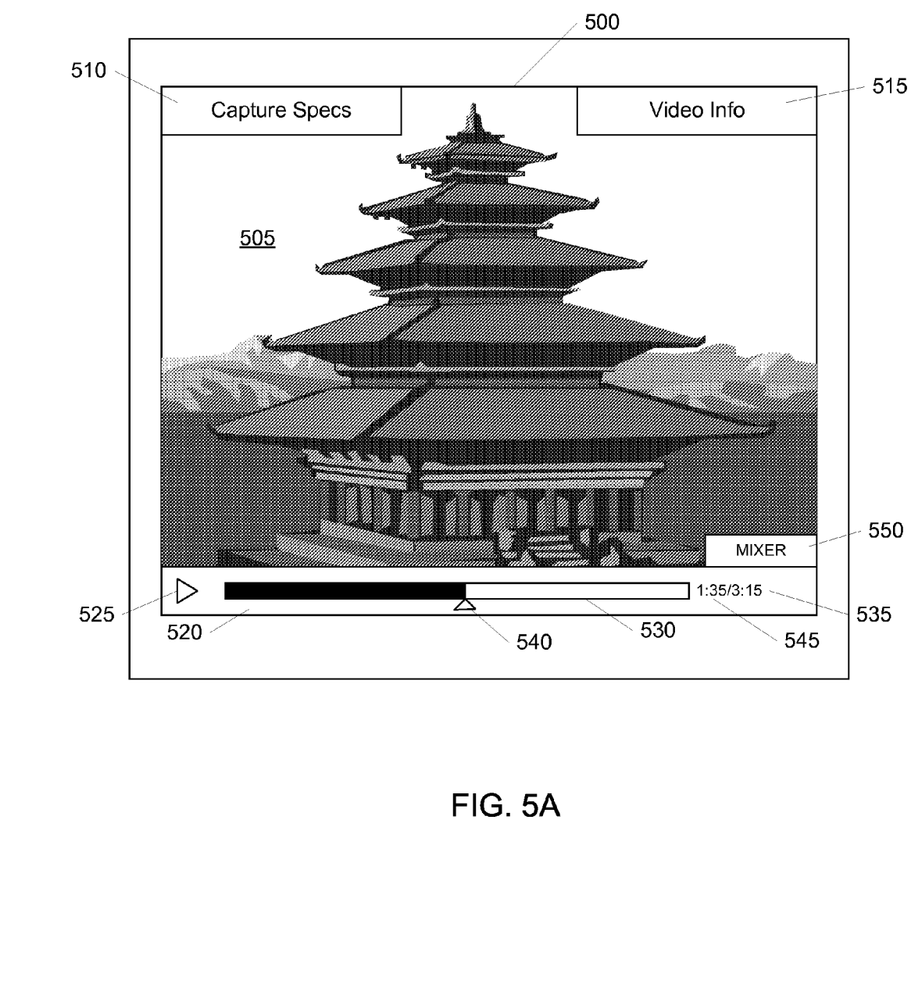
FIGS. 5A and 5B illustrate video capture user interfaces displaying an audio progression bar and mixer controls according to one or more aspects described herein.

FIG. 5A illustrates a video capture user interface displaying an audio progress bar. User interface 500 may display video 505 that is currently being captured along with one or more informational overlays 510, 515 and 520. Overlay 510 may provide capture specifications including capture resolution, frame rate and audio sampling rate. Overlay 515, on the other hand, may display metadata information such as author information, title information, current file size and date. Overlay 520 may display one or more controls 525 for managing the recordation of the video and audio. Controls 525 may include stop, rewind, pause and the like. Controls 525 may control both the video capture and audio recording or each may be controlled separately. Overlay 520 may further include audio progress bar 530 that indicates duration 535 of the corresponding audio content, current position 540 in the audio content and elapsed playback time 545. Alternatively or additionally, progress bar 530 may further indicate an amount downloaded or transferred if the content is being received from another device. In one instance, the amount downloaded or transferred may be indicated by a first bar of a first color while an elapsed playback time may be indicated by a second bar of a second color to aid in differentiation. If audio is being received and mixed from multiple sources, an audio progression bar for each audio stream may be displayed in interface 500.

In one or more configurations, audio progress bar 530 may be displayed on a different device, e.g., the device transmitting the audio content. Alternatively or additionally, progress bar may be displayed on a second display device. Displaying bar 530 on another device or display may conserve space on a user interface. Video capture interface 505 may further include a mixer 550 option for mixing one or more audio streams. Mixer option 550 might only be displayed if more than one audio stream is available for recording.

Figure 5B:
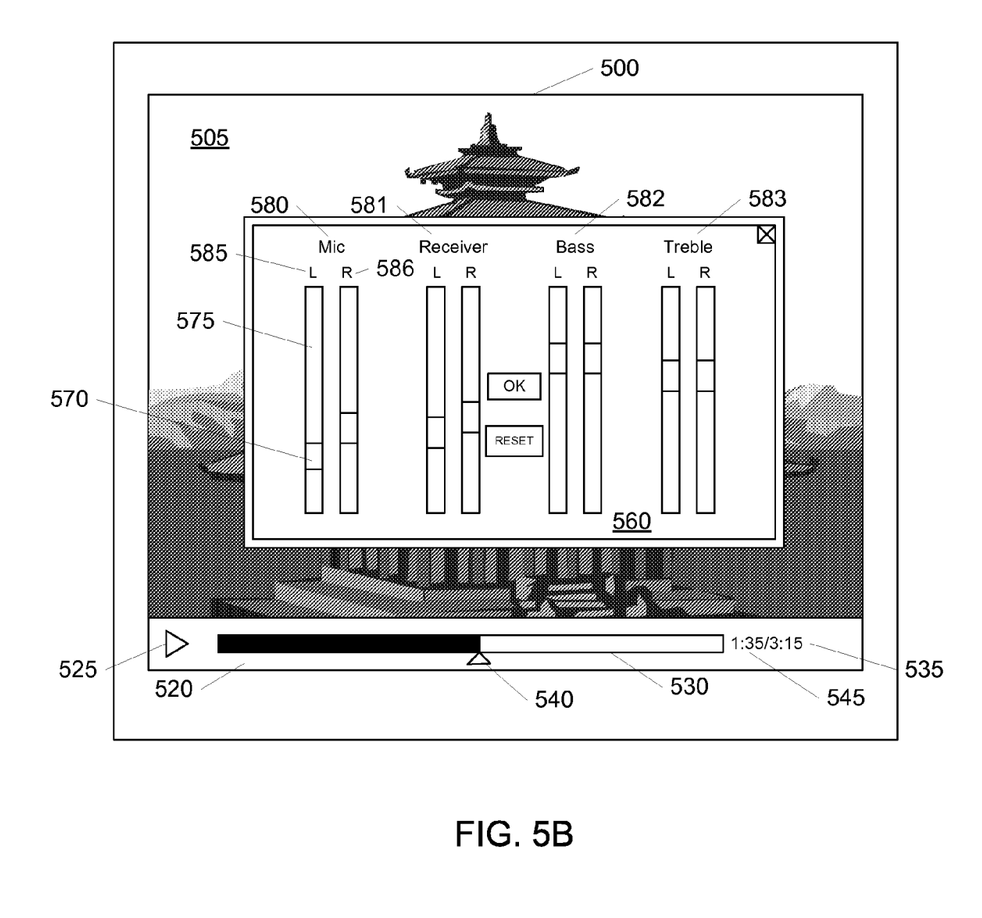

FIG. 5B illustrates user interface 505 after mixer option 550 of FIG. 5A has been selected. Selection of mixer option 550 (FIG. 5A) opens mixer interface 560 displaying multiple sets of controls 580, 581, 582 and 583 for audio inputs and audio attributes (e.g., treble and bass). The mixer thus may allow a user to control the level at which individual audio content streams are recorded. For example, a user may set narration received through a microphone to record louder than background music from a broadcast receiver. Each set of controls 580, 581, 582 and 583 may include a left channel control, e.g., control 585, and a right channel control, e.g., control 586. As such, volume levels for audio output through the different individual channels may be controlled separately and independently. A mixer control such as control 585 may include control bar 575 that conveys a range along which control 585 may be adjusted. Slider 570 may be displayed in bar 575 to indicate a current level at which the control is set. A user may adjust the position of slider 575 to a desired level in bar 575. Other controls and options may be included in mixer interface 560 including controls for activating and deactivating audio inputs.

According to one or more configurations, video being captured and its associated audio and video information may be displayed in different portions of the user interface. For example, audio information may be displayed in a bar positioned across the bottom of the interface while video information may be displayed in a bar vertically positioned along the left side of the interface. The video being captured may occupy the remainder of the interface. The various interface configurations may be modified according to user preferences or based on an optimal viewing size of the video being captured.

Additionally, the methods and features recited herein may further be implemented through any number of computer readable mediums that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method comprising:
receiving, by a first application, audio from a second application, wherein the first application comprises a video recording application, and the second application comprises an audio playback application;
capturing, with the first application, video input;
determining, by the first application, audio content for storing with the video input, wherein determining audio content for storing with the video input includes: determining whether first audio content is being played by the audio playback application, and upon determining that the first audio content is being played by the audio playback application, addition the first audio content as part of the audio content; and
storing, as a single audio-video-file, the video input with audio that is based on the audio content.

2. The method of claim 1, wherein the first application and the second application are running on the same device.

3. The method of claim 2, wherein the device is a mobile communication device.

4. The method of claim 1, wherein the first application runs on a first computing device and the second application runs on a second computing device different from the first computing device, and wherein capturing, with the first application, video input includes receiving the video input from a video capture device of the first computing device.

5. The method of claim 1, wherein the first application runs on a first computing device; and
wherein determining audio content for storing with the video input includes determining whether second audio content is being received from a second computing device, and upon determining that the second audio content is being received from the second computing device, adding the second audio content as part of the audio content, wherein the first computing device receives the second audio content from the second computing device via a wireless connection.

6. The method of claim 4, wherein the first computing device is a first mobile communication device and the second computing device is a second mobile communication device.

7. The method of claim 1, further comprising displaying, by the first application, an audio progress bar indicating a current playback position of the audio content.

8. The method of claim 7, wherein the audio progress bar further includes at least one of an elapsed playtime and remaining playtime.

9. The method of claim 1, further comprising:
receiving, by the first application, second audio content from a source different than the second application; and
mixing the second audio content with the first audio content, forming a single audio signal,
wherein the audio that is based on the audio content is the single audio signal.

10. The method of claim 9, wherein mixing the second audio content with the first audio content includes receiving user configuration of one or more mixing controls and mixing the second audio content with the first audio content according to the received user configuration of the one or more mixing controls.

11. An apparatus, comprising:
a processor; and
one or more computer readable media storing computer readable instructions configured to, with the processor, cause the apparatus to at least:
capture, with a first application, video input;
determine, by the first application, audio content for storing with the video input, wherein determining audio content for storing with the video input includes: determining that the first audio content is being played by the audio playback application, adding the first audio content as part of the audio content; and
store, as a single audio-video-file, the video input with audio that is based on the audio content.

12. The apparatus of claim 11, wherein determining audio content for storing with the video input includes determining whether second audio content is being received from a remote computing device, and upon determining that the second audio content is being received from the remote computing device, adding the second audio content as part of the audio content, wherein the apparatus is configured to receive from the remote computing device via a wireless connection.

13. The apparatus of claim 11, wherein determining audio content for storing with the video input includes determining whether second audio content is being received from a remote computing device, and upon determining that the second audio content is being received from the remote computing device, adding the second audio content as part of the audio content, wherein the apparatus is configured to receive from the remote computing device via a wireless connection.

14. The apparatus of claim 11, wherein the one or more computer readable media further store computer readable instructions configured to, with the processor, cause the apparatus to display an audio progress bar corresponding to the audio content.

15. The apparatus of claim 14, wherein the audio progress bar comprises at least one of an elapsed playback time and a remaining playback time.

16. The apparatus of claim 11, wherein the one or more computer readable media further store computer readable instructions configured to, with the processor, cause the apparatus to:
receive, by the first application, second audio content from a source different that the first application; and
mix the second audio content with the first audio content, forming a single audio signal,
wherein the audio that is based on the audio content is the single audio signal.

17. The apparatus of claim 16, wherein the source includes an audio input device of the apparatus.

18. One or more non-transitory computer readable media storing computer readable instructions configured to, when executed by a processor, cause the processor to at least:
receive, by a first application, audio from a second application, wherein the first application comprises a video recording application and the second application comprises an audio playback application;
capture, with the first application, video input;
determine, by the first application, audio content for storing with the video input, wherein determining audio content for storing with the video input includes determining whether first audio content is being played by the audio playback application, and upon determining that the first audio content is being played by the audio playback application, adding the first audio content as part of the audio content; and
store, as a single audio-video file, the video input with audio based on the audio content.

19. The one or more non-transitory computer readable media of claim 18, further storing computer readable instructions configured to, when executed by the processor, cause the processor to display an audio progress bar corresponding to the audio content.

20. The one or more non-transitory computer readable media of claim 18, wherein the first application runs on a first computing device and the second application runs on a second computing device different from the first computing device, and wherein capturing, with the first application, video input includes receiving the video input from a video capture device of the first computing device.

21. The one or more non-transitory computer readable media of claim 18, wherein determining audio content for storing with the video input includes determining whether second audio content is being received from a remote computing device, and upon determining that the second audio content is being received form the remote computing device, adding the second audio content as part of the audio content, wherein the processor is configured to receive from the remote computing device via a wireless connection.

* * * * *